(12) United States Patent
Gruhl et al.

(10) Patent No.: US 7,523,138 B2
(45) Date of Patent: Apr. 21, 2009

(54) CONTENT MONITORING IN A HIGH VOLUME ON-LINE COMMUNITY APPLICATION

(75) Inventors: Daniel F. Gruhl, San Jose, CA (US); Kevin Haas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/622,112

(22) Filed: Jan. 11, 2007

(65) Prior Publication Data
US 2008/0172412 A1 Jul. 17, 2008

(51) Int. Cl.
*G06F 17/00* (2006.01)
(52) U.S. Cl. .................. 707/104.1; 707/100; 707/101; 707/102
(58) Field of Classification Search ........... 707/104.1, 707/100–102
See application file for complete search history.

(56) References Cited

U.S. PATENT DOCUMENTS

| | | | |
|---|---|---|---|
| 6,859,807 | B1 | 2/2005 | Knight et al. |
| 6,915,284 | B2 | 7/2005 | Adar et al. |
| 7,082,458 | B1 | 7/2006 | Guadagno et al. |
| 2004/0015376 | A1* | 1/2004 | Zhu et al. ............ 705/7 |
| 2006/0229896 | A1* | 10/2006 | Rosen et al. ............ 705/1 |
| 2007/0118454 | A1* | 5/2007 | Bauerschmidt et al. ... 705/36 R |
| 2007/0118460 | A1* | 5/2007 | Bauerschmidt et al. ....... 705/37 |
| 2008/0219422 | A1* | 9/2008 | Polozola et al. ........ 379/127.02 |

OTHER PUBLICATIONS

Woods, A., "Conceptual Indexing a Better Way to Organize Knowledge," Sun Microsystems, Inc. The SML Technical Report Series published by Sun Microsystems Laboratories a Division of Sun Microsystems, Inc., 1997, 99 pages total.
Terveen, L., et al., "Social Matching: A Framework and Research Agenda," ACM Transactions on Computer-Human Interaction, vol. 12, No. 3, Sep. 2005, pp. 401-434.
Millen, D., et al., "Stimulating Social Engagement in a Community Network," CSCW' 02, ACM 1-58113-560-2/02/0011, Nov. 16-20, 2002, pp. 306-313.

\* cited by examiner

*Primary Examiner*—Sana Al-Hashemi
(74) *Attorney, Agent, or Firm*—Gibb I.P. Law Firm, LLC

(57) ABSTRACT

Disclosed are embodiments a system and method for managing an on-line community. Electronic postings are pre-screened based on one or more metrics to determine a risk value indicative of the likelihood that an individual posting contains objectionable content. These metrics are based on the profile of a poster, including various parameters of the poster and/or the poster's record of objectionable content postings. These metrics can also be based on the social network profile of a poster, including the average of various parameters of other users in the poster's social network and/or a compiled record of objectionable content postings of other users in the poster's social network. If the risk value is relatively low, the posting can be displayed to the on-line community immediately. If the risk value is relatively high, display of the posting can be delayed until further content analysis is completed. Finally, if the risk value is above a predetermined high risk threshold value, the posting can be removed automatically.

1 Claim, 3 Drawing Sheets

CONTENT MONITORING IN A HIGH VOLUME ON-LINE COMMUNITY APPLICATION

BACKGROUND

1. Field of the Invention

The embodiments of the invention generally relate to on-line communities and, more particularly, to a system and method for filtering the content of postings to on-line communities.

2. Description of the Related Art

Online communities allow groups of people to communicate and interact via various online media, such as blogs, wikis, internet forums, chat rooms, instant messaging, electronic mail lists, etc. Each of these online communities may have its own community standards related to the content of online media postings. For example, as with real world media, such online media may have standards to prevent the dissemination of objectionable content as defined by each community's own preset or pre-established standards. These standards are typically enforced by way of manual and/or automated content review systems which are used to filter out and remove such objectionable postings. However, as these online communities continue to increase in size, limitations in the ability of current manual and/or automated content review systems to remove objectionable material from community websites in a timely manner have become increasingly apparent. Thus, additional workflows and methods are needed to ensure that community standards are maintained.

SUMMARY

In view of the foregoing, disclosed herein are embodiments a system and an associated method for managing an on-line community and, particularly, for monitoring and filtering the content of electronic postings to an on-line community (e.g., to a community website). The system and method incorporate a pre-screening process in which individual postings are pre-screened based on one or more predetermined metrics to determine a risk value indicative of the likelihood that a posting contains objectionable content. These metrics are not content based. Rather, they can be based on the profile of an individual poster, including various parameters of the poster and/or the poster's record of objectionable content postings. These metrics can also be based on the social network profile of an individual poster, including the average of various parameters of other users in the poster's social network and/or a compiled record of objectionable content postings of other users in the poster's social network. If the risk value is relatively low (e.g., below a low risk threshold value), the posting can be displayed on the website immediately, thereby keeping delay low. If the risk value is relatively high (e.g., above the low threshold value), display of the posting can be delayed until further automated and/or manual content analysis is completed. Finally, if the risk value is above a high risk threshold value, removal of the posting can be made automatic without requiring additional analysis.

More particularly, disclosed herein are embodiments of a system for managing an on-line community and, particularly, for monitoring and filtering the content of postings to an on-line community. The system of the invention can comprise a database and a content management system (e.g., a computer or computer program-based web server or wireless application protocol (WAP) server) in communication with the database.

The database can be adapted to compile and store a plurality of metrics based on collected information related to users of a website (e.g., information related to members of the on-line community). This information can comprise various parameters associated with each of the users (i.e., posters), such as age, gender, educational background, location, length of time as a member of the online community, etc. This information can also include records of objectionable content postings for each of the users onto the website and, if practicable, onto other websites. The information can also include the social networks of each of the users.

The content management system (e.g., web server, WAP server, etc.) can be adapted to receive postings from users, to monitor those postings for objectionable content, as defined by preset standards (e.g., community standards), and to determine whether or not to display the postings (e.g., on a community website). In order to accomplish this, the system of the invention also comprises both a pre-screener and a content filter, which can be integral components of the content management system or can be separate components in communication with the content management system.

The pre-screener is adapted to determine, based on at least one predetermined metric, a risk value that indicates the likelihood that a given posting by a given user contains objectionable content. The metric(s) that are used to determine this risk value are not content-based, but rather are based on the individual poster's profile and/or the social network profile of the individual poster. Specifically, the following are examples of metrics that may be used to determine a risk value of a given posting by a given user: (1) a metric based on parameters associated with the given user; (2) a metric based on a record of objectionable content postings by the given user; (3) a metric based on average predetermined parameters associated with other users in a social network of the given user; and (4) a metric based on a compiled record of objectionable content postings by other users in a social network of the given user. A given user's social network can be limited to other users within the online community with which the given user has a direct relationship (e.g., other users on the given user's contacts or friends list, other users with which the given user has exchanged instant messages, other users with which the given user has communicated on a forum, etc.). The user's social network may also be expanded to include other users with which the given user has an indirect relationship (e.g., contacts of contacts, friends of friends, etc.).

The content management system (CMS) (e.g., web server, WAP server, etc.) can further be adapted to perform different processes, depending upon whether or not the risk value of a given posting, as determined by the pre-screener, is below a predetermined low risk threshold value, above a predetermined high risk threshold value or somewhere in between. For example, to minimize delay for low risk postings, the CMS can be adapted to allow the given posting to be immediately displayed on the website, if the risk value is below the predetermined low risk threshold value. To minimize the risk of exposure of online community members to objectionable content, the CMS can be adapted to automatically remove a given posting from the website without further review, if the risk value is above a predetermined high risk threshold value. However, if the risk value is above the low risk threshold value (e.g., between the low risk threshold value and the high risk threshold value), the CMS can be adapted to request a posting confirmation and/or to analyze the posting itself for objectionable content.

Specifically, as mentioned above, the system of the invention can comprise a content filter. This content filter can be adapted to analyze the content of each of the postings to determine an objectionable content score, which can optionally be weighted based on the risk value. The content management system can further be adapted to display or remove a posting from the website, based on this weighted objectionable content score. The order in which each of the postings is analyzed automatically by the content filter or, for that matter, manually by a website administrator can be dynamically determined by the content management system based on the risk value.

Also disclosed are embodiments of a method for managing an on-line community and, particularly, for monitoring and filtering the content of postings to an on-line community.

The method can comprise receiving from users (e.g., from members of an online community) postings to the on-line community (e.g., to a community website). Then, prior to analyzing each of the postings for objectionable content, as determined by preset community standards, a risk value is determined for each given posting from each given user. This risk value indicates a likelihood that the given posting by the given user contains objectionable content and is determined based on at least one predetermined metric.

The metric(s) that are used to determine this risk value are not content-based, but rather are based on the individual poster's profile and/or the social network profile of the individual poster. Specifically, the following are examples of metrics that may be used to determine a risk value of a given posting by a given user: (1) a metric based on parameters associated with the given user; (2) a metric based on a record of objectionable content postings by the given user; (3) a metric based on average predetermined parameters associated with other users in a social network of the given user; and (4) a metric based on a compiled record of objectionable content postings by other users in a social network of the given user. A given user's social network can be limited to other users within the online community with which the given user has a direct relationship (e.g., other users on the given user's contacts or friends list, other users with which the given user has exchanged instant messages, other users with which the given user has communicated on a forum, etc.). The user's social network may also be expanded to include other users with which the given user has an indirect relationship (e.g., contacts of contacts, friends of friends, etc.).

Once the risk value is determined, then different method steps are performed depending upon whether or not the risk value of a given posting is below a predetermined low risk threshold value, above a predetermined high risk threshold value or somewhere in between. For example, if the risk value is below the predetermined low risk threshold value, then to minimize delay for low risk postings, a given posting can be immediately displayed on the website. Whereas, if the risk value is above a predetermined high risk threshold value, then to minimize the risk of exposure of online community members to objectionable content, a given posting can be automatically removed from the site without further review. However, if the risk value is above the low risk threshold value (e.g., between the low risk threshold value and the high risk threshold value), additional method steps can be performed.

For example, a posting confirmation can be requested from the given user. This request can include a notice setting out the ramifications for violations of the community standards. Additionally, the order in which each of the postings is to be analyzed manually (e.g., by a web administrator) and/or automatically (e.g., by a content filter) can be dynamically determined based on the risk value. Then, the content of each of the postings can be analyzed to determine an objectionable content score, which can optionally be weighted based on the risk value. Based on this weighted objectionable content score, a final decision can be made regarding displaying the posting or removing it from the website.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
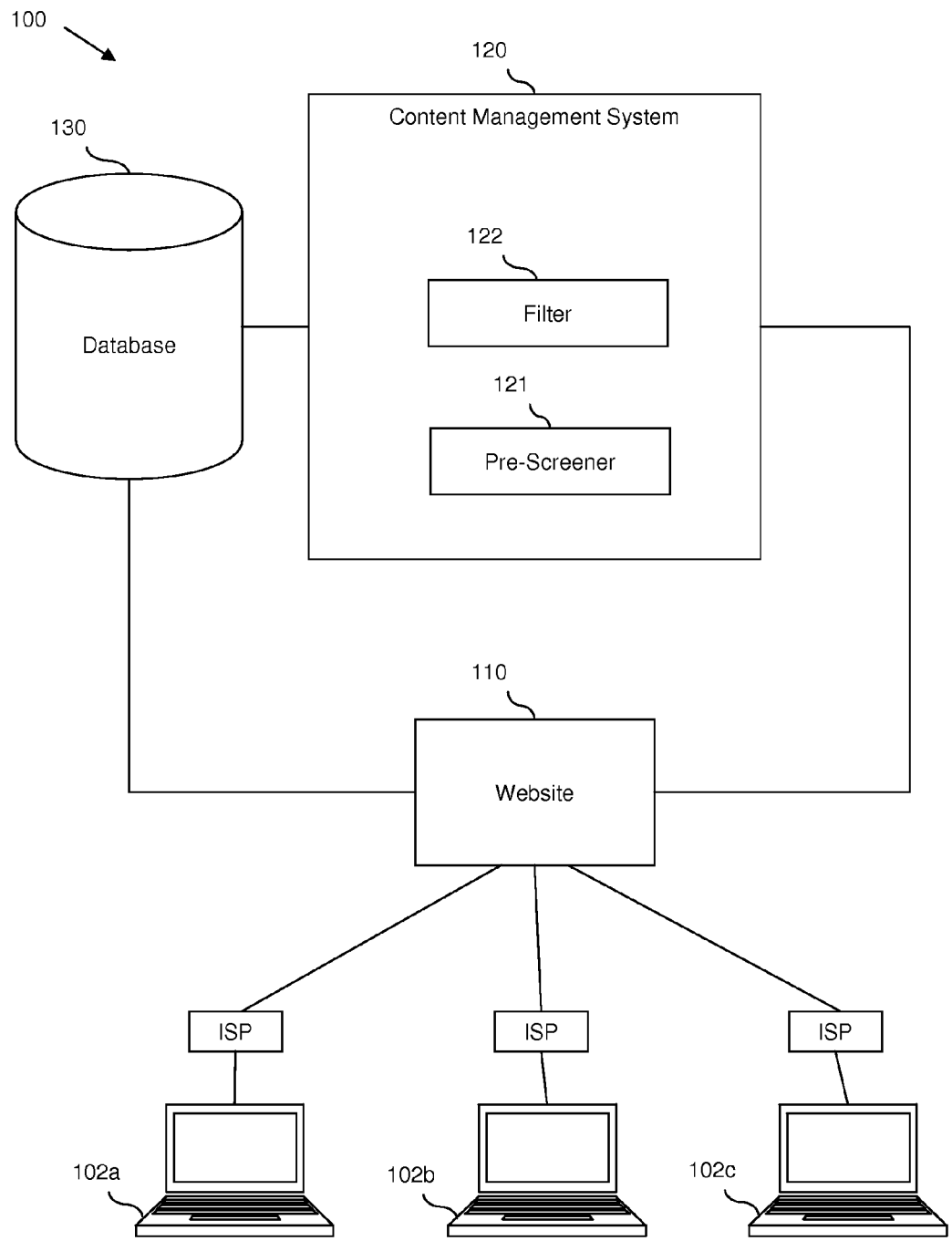
FIG. 1 is a schematic box diagram illustrating an embodiment of a system of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, online communities allow groups of people to communicate and interact via various online media, such as blogs, wikis, internet forums, chat rooms, instant messaging, electronic mail lists, etc. Each of these online communities may have its own community standards related to the content of online media postings. For example, as with real world media, such online media may have standards to prevent the dissemination of objectionable content as defined (preset, predetermined) by each community's standards. However, as these online communities continue to increase, workflows and methods are needed to ensure that community standards are maintained. For the most part, the filtering methods used are limited to contextual-based applications, such as image or text analysis of each posting's content. However, the challenge of identifying and dealing with objectionable information postings to online communities differs from traditional content identification problems in that the figures of merit are based on "Delay" and "Bad Information On Site" (BIoS) time, rather than traditional precision and recall. More particularly, content of one of two types (i.e., good content ($C_g$) and bad content ($C_b$)) can be posted to a web site at time $T_p$ and can be displayed at time $T_d$. If the content is objectionable, it can be removed from the site at time $T_r$. The cost of the solution can be defined as follows. The delay cost is $$Delay_g = \sum_{C_g} T_d - T_p$$

without consideration of bad content. The cost of Bad Information (i.e., objectionable content) on the web site (BIoS) is $$BIoS = \sum_{C_b} Badness * (T_r - T_d)$$

where Badness is an indication of how much of a problem having the objectionable content posted will cause among the members. For simplicity, Badness can be based on lack of unity among the members of the online community. The goal of a web site managing system and method should be to reduce both $Delay_g$ and BIoS as much as possible. The relative importance of these two will vary based on the application In attempting to meet this goal, it has been determined that the probability of objectionable content being uploaded onto a web site (e.g., into online community forum) can be estimated without deep analysis of the information, based on prior behavior of the user and/or the social network of the user. That is, historically well-behaved users (i.e., users that historically post unobjectionable content) and historically misbehaved users (i.e., users that historically post objectionable content) tend to maintain their pattern of behavior. Additionally, both well-behaved users and misbehaved users tend to belong to independent social networks and the individuals within any given social network tend to have similar behavioral patterns. As a result, the likelihood that an individual will be well-behaved or misbehaved user can be inferred from the historic behavior of the user as well as the behavior of others in that user's social network. Additionally, some classes of users (e.g., based on age, gender, length of time as member of the online community, etc.) are more or less likely to offend. For example, those who have been members of an online community for a relatively long period of time are less likely to post objectionable content, than those that have been members for a relatively short period of time.

In view of the foregoing, disclosed herein are embodiments a system and an associated method for managing an on-line community and, particularly, for monitoring and filtering the content of electronic postings to an on-line community (e.g., to a community website). The system and method incorporate a pre-screening process in which individual postings are pre-screened based on one or more predetermined metrics (i.e., scores) to determine a risk value indicative of the likelihood that a posting contains objectionable content. These metrics or scores are not content based. Rather, they can be based on the profile of an individual poster, including various parameters of the poster and/or the poster's record of objectionable content postings. These metrics can also be based on the social network profile of an individual poster, including the average of various parameters of other users in the poster's social network and/or a compiled record of objectionable content postings of other users in the poster's social network. If the risk value is relatively low (e.g., below a low risk threshold value), the posting can be displayed on the website immediately, thereby keeping delay low. If the risk value is relatively high (e.g., above the low threshold value), display of the posting can be delayed until further automated and/or manual content analysis is completed. Finally, if the risk value is above a high risk threshold value, removal of the posting can be made automatic without requiring additional analysis.

More particularly, referring to FIG. 1, disclosed herein are embodiments of a system 100 for managing an on-line community 110 (such as a website containing blogs, wikis, forums, chat rooms, etc.) and, particularly, for monitoring and filtering the content of electronic postings to an on-line community. The system 100 can comprise a database 130 and a content management system 120 (e.g., a computer or computer program based web server or wireless application protocol (WAP) server).

The database 130 can be adapted to compile and store a plurality of metrics based on collected information related to users of the on-line community (e.g., information related to members of the on-line community). This information can comprise various parameters associated with each of the users (i.e., posters), such as age, gender, educational background, location, etc. This information can also include records of objectionable content postings for each of the users onto the website and, if practicable, onto other websites. The information can also include the social networks of each of the users.

The information that is stored in the database 130 can be collected using known techniques. For example, user parameters and social networks (e.g., friend lists, contact lists, etc.) can be input and periodically updated by users via remote computers 102a-b. Alternatively, user parameters can be determined by conventional mining applications that are adapted to scan the contents of the website for such information. Similarly, social network information can be determined by applications adapted maintain records of online communications between users (e.g., records of instant messaging, records of forum discussions, etc.) and to determine direct and indirect relationships based on those records.

The content management system 120 can be in communication with the database 130 and can be adapted to receive electronic postings (e.g., text, images, video, audio, etc. postings) from users, to monitor those postings for objectionable content, as defined by preset standards (e.g., community standards), and to determine whether or not to display the postings to the on-line community 110 (e.g., on the community website). In order to accomplish this, the system 100 of the invention can comprise both a pre-screener 121 and a content filter 122. Those skilled in the art will recognize that the pre-screener 121 and content filter 122 can be integral components of the content management system 120, as shown, or can be comprise separate components in communication with the content management system 120.

The pre-screener 121 is adapted to determine, based on at least one predetermined metric, a risk value that indicates the likelihood that a given posting by a given user contains objectionable content. The metric(s) are scores that are used to determine the risk value. These metrics are not content-based, but rather are based on the individual poster's profile and/or the social network profile of the individual poster. That is, a points system can be predetermined, wherein more points will be assigned (e.g., on a scale of 1-100, or any other scale) to information about a given user (or about that given user's social network) if the information predicts objectionable content postings by the user. Specifically, the following are examples of metrics or scores that may be used to determine a risk value of a given posting by a given user: (1) a metric based on parameters associated with the given user (e.g., a male user age 16-24 may be more likely to post objectionable content than a female user 75-90 and thus such young male user would receive a relatively higher score based on user parameters than an older female); (2) a metric based on a record of objectionable content postings by the given user (e.g., a user that has posted a number of objectionable postings in the past is more likely to post objectionable postings in the future and thus such a user would receive a relatively higher score); (3) a metric based on average predetermined parameters associated with other users in a social network of the given user (e.g., a male in a social network with mostly other males having an average age between 16 and 24 may be more likely to post objectionable content than a female in a social network with mostly other females having an average age between 75 and 90 and thus such a male user would receive a relatively higher score; and (4) a metric based on a compiled record of objectionable content postings by other users in a social network of the given user (e.g., a user that is in a social network with other users that regularly post objectionable postings is more likely to post objectionable postings than a user that associates other users that do not post objectionable postings and thus such a user would receive a relatively higher score). It should be noted that a given user's social network can be limited to other users within the online community with which the given user has a direct relationship (e.g., other users on the given user's contacts or friends list, other users with which the given user has exchanged instant messages, other users with which the given user has communicated on a forum, etc.). The user's social network may also be expanded to include other users with which the given user has an indirect relationship (e.g., contacts of contacts, friends of friends, etc.).

The content management system (CMS) 120 can further be adapted to perform different processes, depending upon whether or not the risk value of a given posting, as determined by the pre-screener 121, is below a predetermined low risk threshold value, above a predetermined high risk threshold value or somewhere in between. For example, to minimize delay for low risk postings, the CMS 120 can be adapted to allow the given posting to be immediately displayed to the on-line community 110 (e.g., displayed on a website), if the risk value is below the predetermined low risk threshold value. To minimize the risk of exposure of online community members to objectionable content, the CMS 120 can be adapted to automatically remove a given posting from the on-line community 110 (e.g., from the website) without further review, if the risk value is above a predetermined high risk threshold value. However, if the risk value is above the low risk threshold value (e.g., between the low risk threshold value and the high risk threshold value), the CMS 120 can be adapted to request a posting confirmation and/or to analyze the posting itself for objectionable content.

Specifically, as mentioned above, the system 100 of the invention can comprise a content filter 122. This content filter 122 can be adapted to analyze the content of each of the postings to determine an objectionable content score. For example, the content filter 122 can be implemented using any conventional training based classifier, such as a naïve Bayes classifier or a similarly-based (SB) classifier. However, the score can optionally also be weighted based on the risk value. Thus, scoring of uploaded content can be accomplished using a weighted fusion of risk value scores (e.g., based on a user's individual behavior or social network) combined with techniques using analytics based on content analysis (e.g., text, image, video, and/or voice analysis) to determine the probability that the posting contains objectionable material. The CMS 120 can further be adapted to display or remove a posting from the on-line community 110 (e.g., a community website), based on this weighted objectionable content score. Additionally, the order in which each of the postings is analyzed by the content filter or, for that matter, manually by a website administrator can be dynamically determined by the CMS 120 based on the risk value.

Thus, in operation, posts to on-line communities 110 enter the system 100 from a number of sources 102a-c. Some of these posts may contain unobjectionable material and some may contain objectionable material, as defined by preset community standards. Each of the posts will be pre-screened by the pre-screener 121 and a decision is made as to the degree of risk (i.e., the risk value) of each particular post. If the risk is low, the content can be displayed to the on-line community 110 (e.g. placed on the community website) immediately, keeping Delay low. If the content needs further evaluation and review (i.e., the risk is higher than a threshold value), display of the content can be delayed and the posting can be subjected to more rigorous computation (e.g., by the content filter 122 and/or by human) review prior to displaying it, keeping BIoS low.

Figure 2:
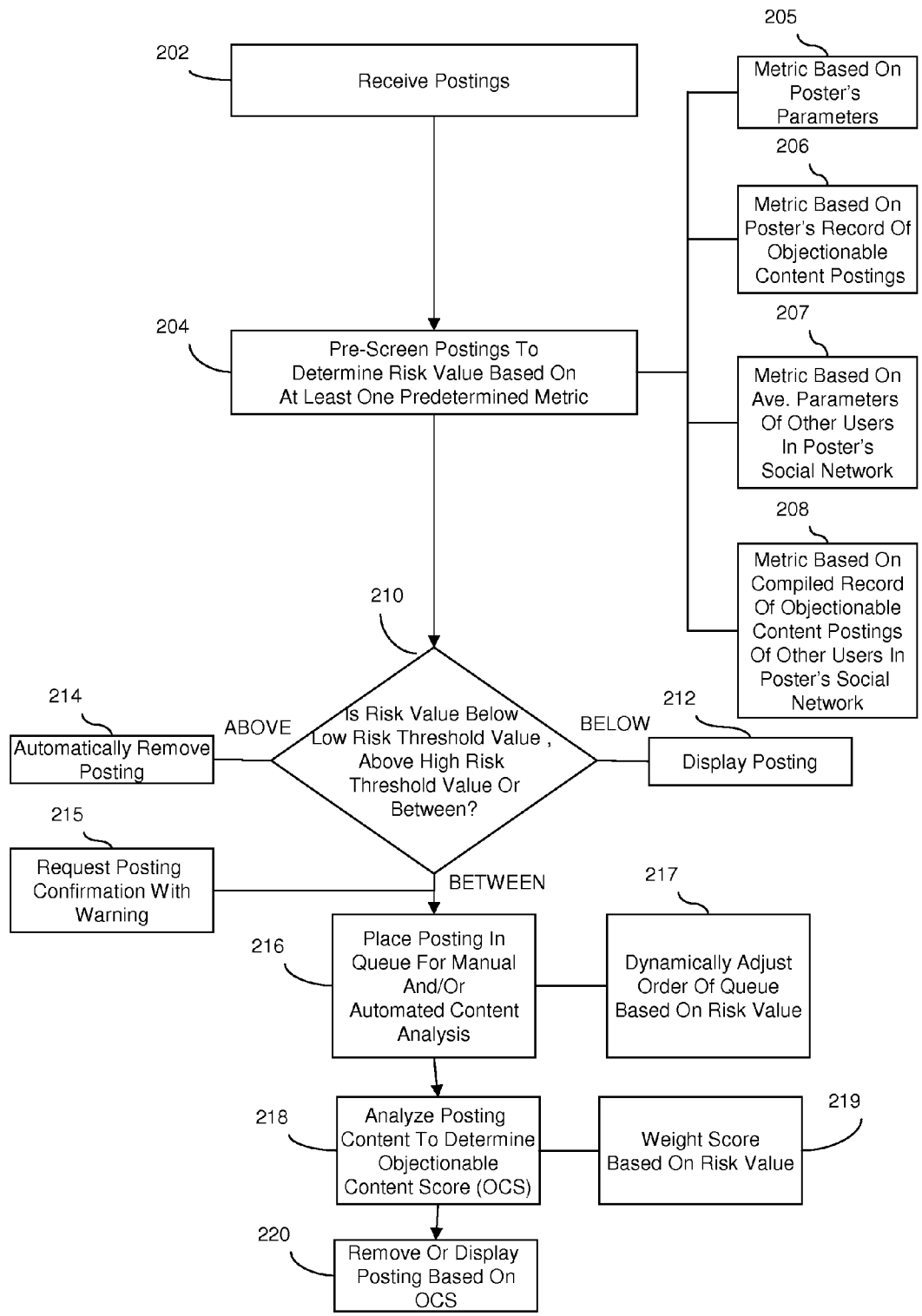
FIG. 2 is a flow diagram illustrating an embodiment of a method of the invention.

Referring to FIG. 2, also disclosed are embodiments of a method for managing an on-line community and, particularly, for monitoring and filtering the content of electronic postings in on-line communities.

The method can comprise receiving from users (e.g., from members of an online community) electronic postings (e.g., text, video, images, audio, etc.) (202). These postings can be, for example, to a community website containing blogs, wikis, forums, chat rooms, etc. Then, prior to analyzing each of the postings for objectionable content, as determined by preset community standards, a risk value is determined for each given posting from each given user (204). This risk value indicates the likelihood that the given posting by the given user contains objectionable content and is determined based on at least one predetermined metric.

The metric(s) that are used to determine this risk value are not content-based, but rather are based on the individual poster's profile and/or the social network profile of the individual poster. Specifically, the following are examples of metrics that may be used to determine a risk value of a given posting by a given user: (1) a metric based on parameters associated with the given user (205); (2) a metric based on a record of objectionable content postings by the given user (206); (3) a metric based on average predetermined parameters associated with other users in a social network of the given user (207); and (4) a metric based on a compiled record of objectionable content postings by other users in a social network of the given user (208). A given user's social network can be limited to other users within the online community with which the given user has a direct relationship (e.g., a first layer of relationships—other users on the given user's contacts or friends list, other users with which the given user has exchanged instant messages, other users with which the given user has communicated on a forum, etc.). The user's social network may also be expanded to include other users with which the given user has an indirect relationship (e.g., second layer of relationships—contacts of contacts, friends of friends, etc.).

Once the risk value is determined, then different method steps are performed depending upon whether or not the risk value of a given posting is below a predetermined low risk threshold value, above a predetermined high risk threshold value or somewhere in between (210). For example, if the risk value is below the predetermined low risk threshold value, then to minimize delay for low risk postings, a given posting can be immediately displayed to the on-line community (e.g., on the community website) (212). Whereas, if the risk value is above a predetermined high risk threshold value, then to minimize the risk of exposure of online community members to objectionable content, a given posting can be automatically removed from the website without further review (214). However, if the risk value is above the low risk threshold value (e.g., between the low risk threshold value and the high risk threshold value), additional method steps can be performed (215-219).

For example, a posting confirmation can be requested from the given user (215). This request can include a notice setting out the ramifications for violations of the community standards. That is, if a posting appears suspicious to the initial set of filters (i.e., has a relatively high risk value), the poster can be asked "are you sure?" with some kind of a notation that offenders will be dealt with harshly. This confirmation is roughly analogous to the theory that people are less likely to vandalize a subway stop with a closed circuit TV visible.

Additionally, the order in which each of the postings is to be analyzed manually (e.g., by a web administrator) and/or automatically (e.g., by a content filter) can be dynamically determined based on the risk value (216-217). Such dynamic ordering may allow the human or automated analyzer to focus on the higher-risk content first, and the low-risk content, already displayed content, will be reviewed as time permits. This ordering process can allow a fixed quantity of human analyzers to be maximally effective on reducing BIoS.

During the analysis process (218), the content of each of the postings can be analyzed to determine an objectionable content score. For example, a conventional training based classification technique, such as a naïve Bayes classification technique or a similarly-based (SB) classification technique, can be used to determine a score that indicates the probability that the content of the posting is objectionable, based on information contained in the posting (e.g., based on an analysis of the text, images, videos, and/or voices contained in the posting). This score can optionally also be weighted based on the previously determined risk value (219). For example, the following exemplary formula can be applied: $POC=0.5*I0+0.33*<I1>+0.17*<I2>$, where the probability of objectionable content is weighted by 50% of the user's behavior (I0), 33% of the average score (I1) of the user's first layer social network (e.g., contact list), and 17% of the average score (I2) of the user's second layer social network (e.g., contacts of contacts). Thus, scoring of uploaded content can be accomplished using a weighted fusion of a risk value (e.g., a value based on a user's individual behavior or social network) combined with a score based on content analysis (e.g., text, image, video, and/or voice analysis) to determine the probability that the posting contains objectionable material. Based on this weighted objectionable content score, a final decision can be made regarding displaying the posting or removing it from the website (220).

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
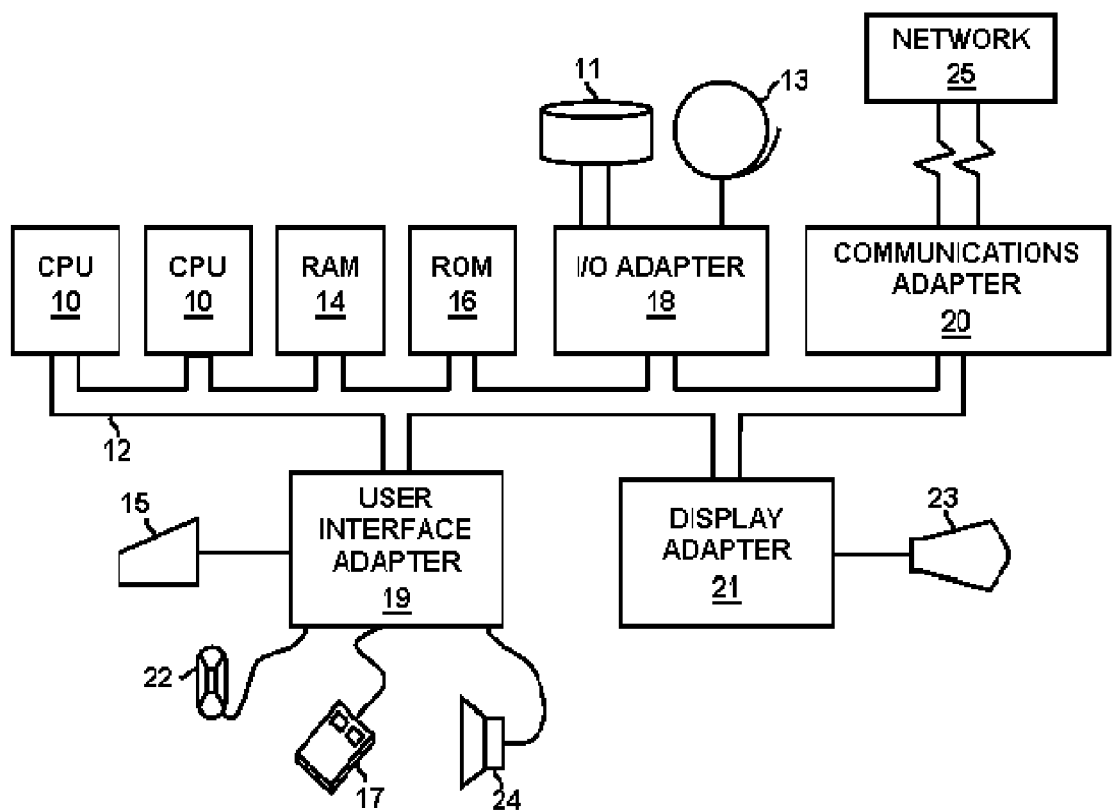
FIG. 3 is a schematic representation of a computer system suitable for implementing the method of the invention as described herein.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

In view of the foregoing, disclosed herein are embodiments a system and an associated method for managing an on-line community and, particularly, for monitoring and filtering the content of electronic postings to on-line communities. The system and method incorporate a pre-screening process in which individual postings are pre-screened based on one or more predetermined metrics (i.e., scores) to determine a risk value indicative of the likelihood that a posting contains objectionable content. These metrics or scores are not based on content analytics. Rather, they are based on the profile of an individual poster, including various parameters of the poster and/or the poster's record of objectionable content postings. These metrics can also be based on the social network profile of an individual poster, including the average of various parameters of other users in the poster's social network and/or a compiled record of objectionable content postings of other users in the poster's social network. If the risk value is relatively low (e.g., below a low risk threshold value), the posting can be displayed to the on-line community (e.g., on the community website) immediately, thereby keeping delay low. If the risk value is relatively high (e.g., above the low threshold value), display of the posting can be delayed until further automated and/or manual content analysis is completed. Finally, if the risk value is above a high risk threshold value, removal of the posting can be made automatic without requiring additional analysis.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments of the invention can be practiced with modification within the spirit and scope of the appended claims.

What is claimed is:

1. A method for managing an on-line community, said method comprising:
   receiving postings to said on-line community from users;
   prior to analyzing each of said postings for objectionable content, as determined by preset standards, determining for each given posting from each given user a risk value based on at least one predetermined metric, wherein said risk value indicates a likelihood that said given posting by said given user contains said objectionable content; and
   if said risk value is below a threshold value, displaying said given posting to said on-line community,
   wherein said at least one predetermined metric comprises a metric based on parameters associated with said given user,
   wherein said at least one predetermined metric comprises a metric based on a record of objectionable content postings by said given user,
   wherein said at least one predetermined metric comprises a metric based on average parameters associated with other users in a social network of said given user,
   wherein said at least one predetermined metric comprises a metric based on a compiled record of objectionable content postings by other users in a social network of said given user, wherein said other users in said social network have a direct relationship with said given user, and
   wherein said at least one predetermined metric comprises a metric based on a compiled record of objectionable content postings by other users in a social network of said given user, wherein at least some of said other users in said social network have an indirect relationship with said given user;
   wherein if said risk value is above said threshold value, said method further comprises automatically removing said posting;
   wherein if said risk value is above said threshold value, said method further comprises requesting posting confirmation from said given user and notifying said given user of ramifications for violations of said standards;
   wherein said method further comprises dynamically determining an order for analyzing said postings for said objectionable content, wherein said order is based on said risk value of each of said postings; and
   wherein said method further comprises analyzing each of said postings to determine an objectionable content score, wherein said objectionable content score is weighted based on said risk value.

* * * * *